March 26, 1963 H. P. BULLARD 3,082,753
VAPOR PHASE COOLING SYSTEM FOR INTERNAL COMBUSTION ENGINE
Filed Jan. 30, 1961 2 Sheets-Sheet 1
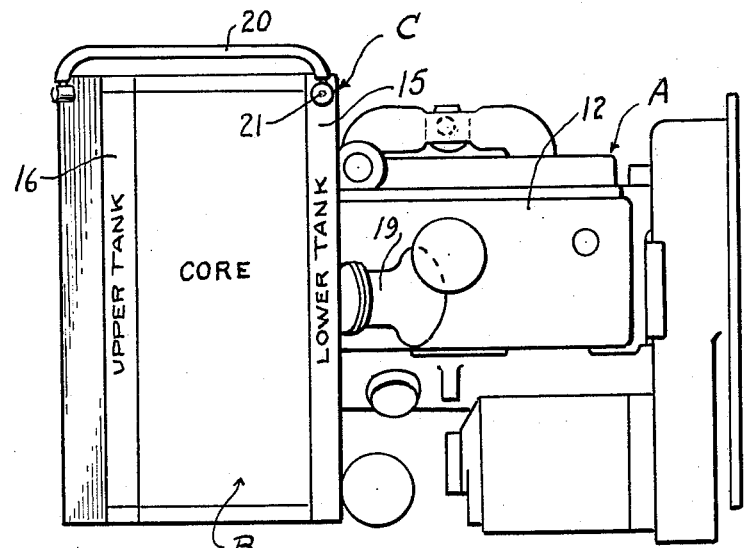
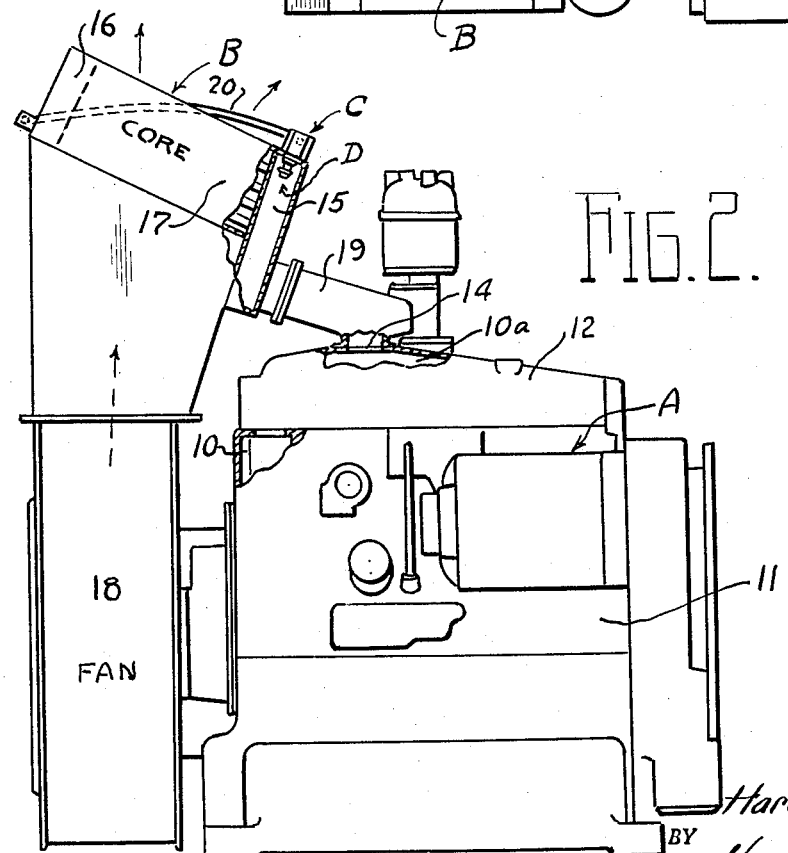
INVENTOR.
Harold P. Bullard
BY
Hauke & Hauke.
Attorneys.

March 26, 1963 H. P. BULLARD 3,082,753
VAPOR PHASE COOLING SYSTEM FOR INTERNAL COMBUSTION ENGINE
Filed Jan. 30, 1961 2 Sheets-Sheet 2
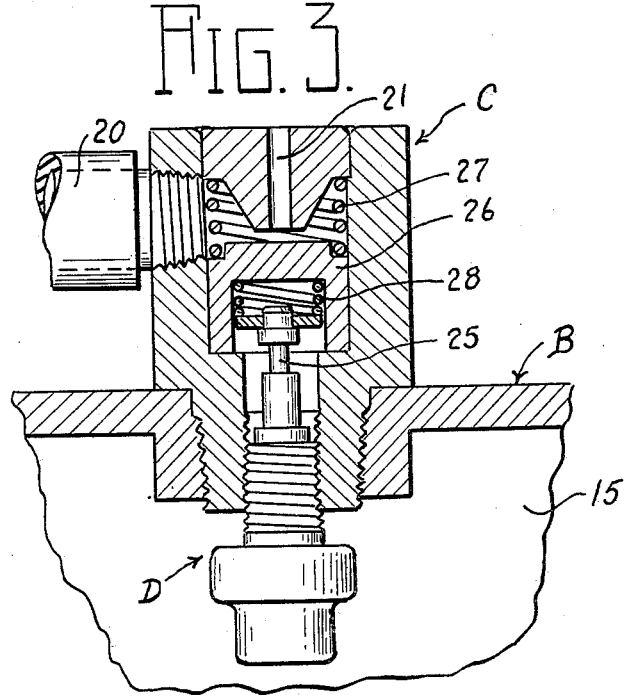
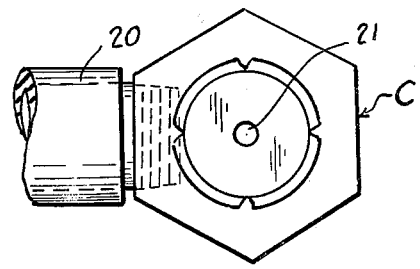
INVENTOR.
Harold P. Bullard
BY
Hauke & Hauke
Attorneys

United States Patent Office 3,082,753
Patented Mar. 26, 1963

3,082,753
VAPOR PHASE COOLING SYSTEM FOR INTERNAL COMBUSTION ENGINE
Harold P. Bullard, Spring Lake, Mich., assignor to Continental Motors Corporation, Muskegon, Mich., a corporation of Virginia
Filed Jan. 30, 1961, Ser. No. 85,910
3 Claims. (Cl. 123—41.08)

This invention relates to internal combustion engines, and more particularly to a vapor phase cooling system for such engines having a substantially closed coolant circulatory system.

Vapor phase cooling systems now in general use throughout the industry lose much coolant vapor through the vent, particularly at such times when the engine is shut down, because the vapor generated by residual engine heat is not condensed due to the fact that the blower for circulating cooling air through the condenser or heat exchanger is also inoperative. While such venting permits economical construction of the heat exchanger for operation at atmospheric pressure, it also permits loss of coolant vapor, and thus the engine requires more frequent servicing for adding coolant to the system.

Engines of this type having a vapor phase cooling system are primarily designed for long periods of unattended operation, and it is highly desirable to operate such engines with a minimum of servicing. Frequent servicing is of itself a definite disadvantage and this coolant loss may also lead to inconvenient and expensive interruptions of operation.

It is an object of the present invention to overcome the above mentioned difficulties, to lengthen engine life and to provide a more efficient and reliable vapor phase cooling system by providing an air bleed valve controlled by a heat sensing device and which valve operates to limit pressure in the engine cooling system and to substantially eliminate vapor loss.

Further objects of the invention are to attain improved engine efficiency by constructing a vapor phase cooling system which minimizes coolant losses, and further comprises a general arrangement of parts and details serving to provide a compact assembly and a minimum of moving parts.

For a more complete understanding of the invention, the construction and operation of the aforesaid vapor phase cooling system, reference may be had to the accompanying drawings illustrating a preferred embodiment of the invention in which like parts and details are referred to in the accompanying specification by like reference characters and in which—

FIG. 1 is a plan view of an internal combustion engine embodying a vapor phase cooling system embodying the features of the invention.

FIG. 2 is a side elevational view thereof.

FIG. 3 is a detail sectional view of an air bleed valve as incorporated with the aforesaid vapor phase cooling system, and FIG. 4 is a plan view of the valve shown in FIG. 3.

The present invention is illustrated as incorporated with a conventional internal combustion engine "A" having a conventional cooling jacket 10 through which a coolant may be circulated. The cooling system for said engine comprises a substantially closed circulatory system, the coolant being circulated through the coolant jacket 10 of the engine block 11 and the coolant jacket 10a of the cylinder head 12. An outlet 14 is provided in the cylinder head 12 and openly communicates with the lower header 15 of the heat exchanger B.

The heat exchanger B serves to condense the vapor generated in the engine cooling system during engine operation, and comprises in general a lower header 15, an upper header 16, connected by a core section 17 having pipes or conduits through which the coolant vapor may flow. A fan 18 driven by said engine is operated to flow cooling air through the core to condense the coolant vapor, the liquid condensate draining back into the lower header 15 and subsequently through the connection 19 and through outlet port 14 into the engine coolant jacket.

An air bleed valve C is preferably shown as carried in an upper corner of the lower header and said valve is provided with a temperature sensing element extending into the interior of the lower header where same is located in heat transfer relation with the coolant vapor in said lower header.

The upper header is provided with an outlet opening or vent for permitting air trapped in the engine cooling system, and which lies dormant in said heat exchanger while the engine is not in operation, to escape. Thermal expansion of the coolant after the engine starts and is approaching normal operating temperature forces the air through this vent and through an escape duct or conduit 20 into the air bleed valve C (see FIG. 3). The valve C is provided with a vent discharge opening 21 which is normally open to the escape duct or conduit 20 while the engine is not in operation or is operating at a sufficiently low temperature so as not to generate any coolant vapor which escapes into the heat exchanger or condenser B.

A temperature sensing element D is carried by the air bleed valve structure C, and same preferably extends into the upper corner of the lower header 15 where it senses the vapor temperature in said header. When the coolant vapor escapes into the header 15 from the engine, the heat of this vapor causes thermal expansion of the temperature sensing element causing the pin 25 to move and close the seating element 26 against the outlet vent 21. As long as there is coolant vapor in said header 15 the air bleed valve remains closed and said valve opens only when the vapor has been condensed and returned to the engine cooling jacket. Suitable springs 27 and 28 are utilized to respectively open the valve and return the pin 25 to inoperative position.

In the operation of the present invention, the air in the system is first expanded and vented into the escape duct 20 and through the open air bleed valve C. However, before any coolant vapor can escape through the air bleed valve, the heat sensing element D is actuated to close the valve, since the hot coolant vapor comes into contact first with said heat sensing element.

Obviously the air bleed valve remains closed during engine operation, as coolant vapor is continuously being generated in the engine and condensed in the heat exchanger. On stopping the engine, the residual heat in said engine continues to generate vapor, and also a moderate pressure, as the fan 18 is now inoperative and no cooling air is being forced through the heat exchanger core. However, the temperature of the vapor maintains the air bleed valve closed during this "after surge" period to prevent loss of coolant from the system. As the engine, while inoperative, gradually cools off, the generation of vapor is stopped and the air bleed valve is permitted to open. Primarily, the above operation avoids the loss of coolant by utilizing its temperature and change of state to either close or open the cooling system to atmosphere as required. Thus, initial air is vented from the system to prevent generation of excessive pressure and the valve is closed under all conditions of engine operation which could otherwise result in loss of coolant.

I claim:

1. A vapor phase cooling system for an internal combustion engine comprising a substantially closed coolant circulatory system, a heat exchanger having fluid coils in open communication with the engine coolant system, means flowing cooling fluid in heat exchange relation with respect to the fluid coils of said heat exchanger to condense vapor present in said fluid coils, means returning any condensate from said heat exchanger to said engine coolant system, means operatively associated with said heat exchanger to vent said vapor phase cooling system, said means comprising a heat sensitive air bleed valve normally open to the atmosphere during engine inoperative periods and automatically closed in response to a predetermined temperature condition of the vapor in said vapor phase cooling system, said fluid coils being arranged to provide flow of said vapor in one direction through said coils, said venting means being connected adjacent said coils downstream of said vapor flow, and said heat sensitive valve being connected for sensing temperature adjacent said coils upstream of said vapor flow.

2. In a vapor phase cooling system for an internal combustion engine having a substantially closed coolant circulatory system, a heat exchanger assembly operable to condense coolant vapor and return said condensate to the engine coolant system, an air bleed valve means for venting said engine coolant system, said air bleed means comprising a temperature sensing means connected upstream of vapor flow through said heat exchanger assembly, and vent means operable thereby, and connected downstream of vapor flow through said heat exchange assembly, said sensing means being operable to open and close said vent means in response to predetermined temperature conditions of the engine coolant upstream of vapor flow through said heat exchanger assembly.

3. The system as defined in claim 1 and in which said heat exchanger comprises an upper and lower header and fluid coils connecting said headers, said upper header being positioned downstream of vapor flow through said coils and said lower header being positioned upstream of said vapor flow, said venting means being connected to said upper header and said heat sensitive valve being connected for sensing temperature in said lower header.

References Cited in the file of this patent

UNITED STATES PATENTS 2,292,946    Karig _____ Aug. 11, 1942